(12) United States Patent
Ishizuka et al.

(10) Patent No.: US 10,201,953 B2
(45) Date of Patent: Feb. 12, 2019

(54) STEEL FOIL AND METHOD FOR MANUFACTURING THE SAME

(71) Applicants: Nippon Steel & Sumitomo Metal Corporation, Tokyo (JP); Nippon Steel & Sumikin Materials Co., Ltd., Tokyo (JP)

(72) Inventors: Kiyokazu Ishizuka, Tokyo (JP); Yuji Kubo, Tokyo (JP); Jun Nakatsuka, Tokyo (JP); Shuji Nagasaki, Tokyo (JP)

(73) Assignees: NIPPON STEEL & SUMITOMO METAL CORPORATION, Tokyo (JP); NIPPON STEEL & SUMIKIN MATERIALS CO., LTD., Tokyo (JP)

(*) Notice: Subject to any disclaimer, the term of this patent is extended or adjusted under 35 U.S.C. 154(b) by 893 days.

(21) Appl. No.: 14/354,205

(22) PCT Filed: Apr. 18, 2013

(86) PCT No.: PCT/JP2013/061478
§ 371 (c)(1),
(2) Date: Apr. 25, 2014

(87) PCT Pub. No.: WO2013/157600
PCT Pub. Date: Oct. 24, 2013

(65) Prior Publication Data
US 2014/0287259 A1 Sep. 25, 2014

(30) Foreign Application Priority Data
Apr. 19, 2012 (JP) ................................ 2012-095824

(51) Int. Cl.
*B32B 15/01* (2006.01)
*C25D 5/48* (2006.01)
(Continued)

(52) U.S. Cl.
CPC .............. *B32B 15/015* (2013.01); *B21B 1/38* (2013.01); *C21D 1/26* (2013.01); *C21D 8/0473* (2013.01);
(Continued)

(58) Field of Classification Search
CPC ........................................................ B32B 15/01
See application file for complete search history.

(56) References Cited

U.S. PATENT DOCUMENTS

| | | | |
|---|---|---|---|
| 2011/0168303 A1* | 7/2011 | Kato | .................... C21D 8/0236 148/603 |
| 2013/0086971 A1* | 4/2013 | Tomomori | ............... C25D 5/18 72/379.2 |

FOREIGN PATENT DOCUMENTS

| | | |
|---|---|---|
| CH | 299223 | 5/1954 |
| CN | 1600904 A | 3/2005 |

(Continued)

OTHER PUBLICATIONS

English machine translation of Izumi et al. (JP 2002-363789), EPO, accessed Nov. 28, 2016.*

(Continued)

*Primary Examiner* — Humera N Sheikh
*Assistant Examiner* — Xiaobei Wang
(74) *Attorney, Agent, or Firm* — Birch, Stewart, Kolasch & Birch, LLP

(57) ABSTRACT

A steel foil according to an aspect of the present invention includes a rolled steel foil; and a Ni having <111>//RD texture plated on an outermost layer of the rolled steel foil. Regarding the steel foil, a <111> pole density in an inverse pole figure of a rolling direction may be 3.0 or more and 6.0 or less.

8 Claims, 4 Drawing Sheets

(51) Int. Cl.
| | |
|---|---|
| C23C 2/28 | (2006.01) |
| C22F 1/10 | (2006.01) |
| C21D 9/46 | (2006.01) |
| C21D 1/26 | (2006.01) |
| B21B 1/38 | (2006.01) |
| C22C 38/06 | (2006.01) |
| C22C 38/14 | (2006.01) |
| C25D 7/06 | (2006.01) |
| C21D 8/04 | (2006.01) |
| C22C 19/03 | (2006.01) |
| C22C 38/00 | (2006.01) |
| C22C 38/04 | (2006.01) |
| C22C 38/12 | (2006.01) |
| H01M 4/66 | (2006.01) |

(52) U.S. Cl.
CPC ............ *C21D 8/0478* (2013.01); *C21D 9/46* (2013.01); *C22C 19/03* (2013.01); *C22C 38/001* (2013.01); *C22C 38/004* (2013.01); *C22C 38/04* (2013.01); *C22C 38/06* (2013.01); *C22C 38/12* (2013.01); *C22C 38/14* (2013.01); *C22F 1/10* (2013.01); *C23C 2/28* (2013.01); *C25D 5/48* (2013.01); *C25D 7/0614* (2013.01); *H01M 4/662* (2013.01); *B21B 2001/383* (2013.01); *C21D 2201/05* (2013.01); *C21D 2251/02* (2013.01); *Y10T 428/12438* (2015.01)

(56) References Cited

FOREIGN PATENT DOCUMENTS

| | | |
|---|---|---|
| CN | 101662012 | 3/2010 |
| JP | 04-247849 | 9/1992 |
| JP | 06-310126 | 11/1994 |
| JP | 06-310147 | 11/1994 |
| JP | 07-220721 | 8/1995 |
| JP | 07-249409 | 9/1995 |
| JP | 11-233117 | 8/1999 |
| JP | H11-315346 | * 11/1999 |
| JP | 3185530 | 7/2001 |
| JP | 2002-083594 | 3/2002 |
| JP | 2002-363789 | 12/2002 |
| JP | 2003-007305 | 1/2003 |
| JP | 2004-043897 | * 2/2004 |
| JP | 2004-288520 | 10/2004 |
| JP | 2005-078894 | 3/2005 |
| JP | 2006-140018 | 6/2006 |
| JP | 2009-295470 | 12/2009 |
| JP | 2010-033782 | 2/2010 |
| JP | 2011-171158 | 9/2011 |
| JP | 2012-33470 A | 2/2012 |
| WO | WO2011083559 | * 7/2011 ............... B32B 1/08 |

OTHER PUBLICATIONS

English machine translation of Izumi (JP 2002-363789), EPO, accessed Feb. 27, 2017.*
English machine translation of Honda (JP 2006-140018), EPO, accessed Feb. 27, 2017.*
English machine translation of JP2004-043897, EPO, accessed Feb. 12, 2018.*
English machine translation of JPH11-315346, EPO, accessed Feb. 12, 2018.*
Suwas et al., Crystallographic Texture of Materials; Chapter 2: Representation of Texture, 2014, Engineering Materials and Processes, pp. 11-38. (Year: 2014).*
Search Report dated Aug. 31, 2015 issued in corresponding European Application No. 13778678.6.
Office Action dated Jun. 23, 2015 issued in corresponding Chinese Application No. 201380003787.0 [with English Translation].
International Search Report dated Jul. 30, 2013 issued in corresponding PCT Application No. PCT/JP2013/061478 [with English Translation].
Chinese Office Action and Search Report for Chinese Application No. 201380003787.0, dated Jun. 1, 2016, and English translation.
Japanese Office Action dated Nov. 1, 2016 for Japanese Application No. 2013-549626, with English translation.

* cited by examiner

MISORIENTATION OF 15° OR MORE

MISORIENTATION OF 2° OR MORE AND 5° OR LESS

STEEL FOIL AND METHOD FOR MANUFACTURING THE SAME

TECHNICAL FIELD

The present invention relates to a plated steel foil which can be used in a negative electrode current-collecting foil of a nonaqueous electrolyte secondary battery represented as a lithium ion secondary battery.

This application is a national stage application of International Application No. PCT/JP2013/061478, filed Apr. 18, 2013, which claims priority to Japanese Patent Application No. 2012-095824, filed on Apr. 19, 2012, the content of which is incorporated herein by reference.

BACKGROUND ART

Since nonaqueous electrolyte secondary batteries represented as lithium ion secondary batteries have high energy density, the nonaqueous electrolyte secondary batteries are used as power sources for mobile communication and portable information terminals. In recent years, the nonaqueous electrolyte secondary batteries have been started to be practical for use in vehicles, and the nonaqueous electrolyte secondary battery market has rapidly expanded. Accordingly, in order to pursue a further reduction in size and weight of equipment, there has been a demand for performance improvement for achieving a further reduction in size and weight of batteries occupying a large volume in the equipment.

Currently, negative electrode active materials used in the secondary batteries (hereinafter, referred to as "active materials" in some cases) are mainly graphite-based carbon materials. The graphite-based carbon materials are key materials influencing the performance of the batteries. However, an amount of lithium which can be reversibly intercalated and deintercalated in the graphite-based carbon material is limited to one lithium atom per 6 carbon atoms. A theoretical charging/discharging limit capacity of the carbon material calculated from the limit value is 372 mAh/g in terms of electric capacity. Since the current secondary batteries have been used at a level close to the limit capacity, it is difficult to expect a remarkable performance improvement in the future.

Under the circumstances, searches for materials other than carbon are being conducted, for example, materials which are alloys or inorganic compounds and have an electric capacity of much higher than 372 mAh/g. Among them, particularly, in crystalline oxide materials containing tin and/or silicon or amorphous oxide materials, materials exhibiting a discharge capacity close to 1,000 mAh/g have been found (for example, refer to Patent Documents 1 and 2).

However, the above-described high capacity active materials undergo larger volume fluctuations, caused by lithium intercalation and deintercalation, than the graphite-based carbon materials in the related art. Thus, as the charging/discharging cycle is repeated, pulverization of the active materials, exfoliation of the active materials from current collectors, or the like occurs. As described above, the active materials disclosed in Patent Documents 1 and 2 have a problem in that good charging/discharging cycle properties cannot be obtained.

Regarding the problem, it has been found that an electrode for a lithium secondary battery formed by depositing an amorphous silicon thin film or a microcrystalline silicon thin film on a current collector such as a copper foil as an active material by a CVD method or a sputtering method exhibits good charging/discharging cycle properties (refer to Patent Document 3). This is because the active material thin film tightly adheres to the current collector.

In addition, a method has been found for manufacturing a current collector by disposing a conductive intermediate layer containing polyimide between the layers containing the silicon-based active material, or between the layer containing the silicon-based active material and the metal foil current collector as a binder, and then, in the state in which the conductive intermediate layer is disposed on the metal foil current collector, sintering the deposited body in a non-oxidizing atmosphere (refer to Patent Document 4). Here, the conductive intermediate layer prevents a mixture layer from being exfoliated from the current collector by the expansion and constriction of the negative electrode active material accompanying a charge/discharge reaction, and thus, the adhesion between the mixture layer and the current collector is enhanced.

However, since the active material layer tightly adheres to the current collector in such an electrode for a lithium secondary battery, there is a problem in that a large stress is applied to the current collector due to a volume fluctuation of the active material thin film accompanying the charge/discharge reaction. Due to the stress, deformation occurs in the current collector, wrinkles are generated, and further, the adhesion between the current collector and the active material is deteriorated. Thus, the battery life is reduced.

To suppress the stress generation, there is a demand for a current collector which has a higher strength so that the current collector can resist the stress caused by volume expansion of the active material. As one way to enhance the tensile strength of the current collector, it can be considered that the thickness of the current collector is increased. However, there are disadvantages in that a significant enhancement in the tensile strength of the current collector cannot be expected simply by increasing the thickness of the current collector and also the energy density of the battery per unit weight is reduced due to an increase in the weight and volume of the battery.

Currently, as the metal foil for the negative electrode current collector, a copper foil is mainly used. A representative copper foil for the negative electrode current collector includes a copper foil manufactured by rolling and a copper foil (electrolytic copper foil) manufactured by an electrolysis method. However, with respect to high-strengthening of the current collector using the copper foil, there is a limitation in the use of the electrolytic copper foil. Accordingly, a method for manufacturing a high-strength copper foil by a rolling method has been considered, and it has been proposed that the rolled copper alloy foil be used as the negative electrode current collector (refer to Patent Document 5).

However, as the thickness of the rolled copper foil is reduced, manufacturing cost increases. Therefore, it is possible to obtain a thin and high-strength current collector, but this current collector has a problem in that economic efficiency is deteriorated.

Further, the use of the copper foil as the negative electrode current collector is not an optimal choice from the viewpoint of battery properties. When the lithium ion secondary battery normally works, the potential of the negative electrode is less than 2 V vs. Li in many cases, which is very low. However, when a short circuit or over-discharge occurs in the battery, the potential of the negative electrode is more than 3 V vs. Li in some cases. At such high potential, there is a problem in that the copper is rapidly dissolved and battery properties are deteriorated.

Further, since copper is a metal having a large specific gravity (specific gravity: 8.9), in the case in which the copper foil is used as the negative electrode current collector, a weight ratio of the negative electrode current-collecting foil occupying the battery is relatively increased and energy density per weight of the battery is prevented from being increased. In addition, there is an economic problem such as high cost in the copper foil. For example, the copper foil is expensive compared to an Al foil used in a positive electrode.

From the above-described circumstance, a negative electrode current-collecting foil has been desired which is thin, high in strength, lightweight, economic, and excellent in metal elution resistance during over-discharge, and expectations have been placed on an iron-based foil as the material thereof.

Since the electric resistance of iron is larger than the electric resistance of copper, questions have been raised about properties as the current collector. However, since a battery structure has been improved and battery applications and requested properties have been diversified in recent years, the electric resistance is not always a problem.

The following technique for a battery using an iron foil as the negative electrode current collector may be used. In Patent Document 6, it has been proposed that an electrolytic iron foil having a thickness of 35 μm or less be used as a negative electrode current collector. In addition, it has been also proposed that an electrolytic iron foil plated with Ni be used from the viewpoint of corrosion resistance.

However, it is difficult to increase the efficiency in electrolysis and the electrolytic iron foil is not always economic. In addition, Ni plating of the electrolytic foil is a factor which causes an increase in cost. Further, unless thickness of the Ni plating is formed thick (1 μm or more), when it has been over-discharge, Fe elution is unavoidable.

In Patent Document 7, it has been proposed that a metal foil obtained by depositing iron sesquioxide on a surface of an iron foil or a nickel-plated iron foil be used as a negative electrode current collector. However, even in the metal foil, Fe elution is unavoidable during over-discharge, and further, a side reaction easily occurs at potential of a negative electrode. As a result, battery efficiency or battery life is easily deteriorated.

In Patent Document 8, it has been proposed that a steel foil which is coated with aluminum or an aluminum-based alloy be used as a negative electrode current collector, and a method for obtaining a negative electrode current collector by foil-rolling a hot-dip aluminized steel sheet is recommended. However, in this case, the operation potential of the negative electrode is limited to 0.5 V (relative to Li) or higher. Thus, there are problems in that current carbon-based negative electrode active materials cannot be used and high capacity negative electrode active materials such as Si or Sn also cannot be used. In addition, if the hot-dip aluminized steel sheet is foil-rolled to obtain a foil with a thickness of about 30 μm or less, it is difficult to prevent a crack of plating or an exfoliation of plating. The crack of plating or an exfoliation of plating causes a reduction in corrosion resistance or metal elution resistance during over-discharge in the negative electrode current collector.

In Patent Document 9, even application for an alkali battery, a method that improves adhesion of an active material by using the crack which is generated on the Ni hard layer by foil-rolling after a Ni hard layer is formed on a thin steel sheet. A negative electrode current collector obtained by this method may be effective in the application for the alkali battery, but in application for a lithium ion battery, since the crack causes corrosion of underlying steel or elution during over-discharge, good properties cannot be obtained. Further, when trying to form a thin foil with a thickness of about 30 μm or less, a crack or an exfoliation of the Ni hard layer is generated. Therefore, it is difficult to obtain a foil with a good surface state.

In Patent Document 10, a ferritic stainless steel foil current collector is proposed. However, the ferritic stainless steel foil is not economical compared to a copper foil, and also adhesion with an active material may not be sufficient.

PRIOR ART DOCUMENT

Patent Document

[Patent Document 1] Japanese Unexamined Patent Application, First Publication No. H07-220721
[Patent Document 2] Japanese Unexamined Patent Application, First Publication No. H07-249409
[Patent Document 3] Japanese Unexamined Patent Application, First Publication No. 2002-83594
[Patent Document 4] Japanese Unexamined Patent Application, First Publication No. 2004-288520
[Patent Document 5] Japanese Unexamined Patent Application, First Publication No. 2003-7305
[Patent Document 6] Japanese Unexamined Patent Application, First Publication No. H06-310147
[Patent Document 7] Japanese Unexamined Patent Application, First Publication No. H06-310126
[Patent Document 8] Japanese Unexamined Patent Application, First Publication No. 2009-295470
[Patent Document 9] Japanese Unexamined Patent Application, First Publication No. H11-233117
[Patent Document 10] Japanese Unexamined Patent Application, First Publication No. 2010-33782

DISCLOSURE OF THE INVENTION

Problems to be Solved by the Invention

The present invention aims to provide a high strength steel foil for a negative electrode current collector having excellent corrosion resistance, metal elution resistance during over-discharge and stability in a negative electrode potential by using a steel foil which is thin, high in strength, lightweight and economic.

Means for Solving the Problem

The gist of the present invention is as follows.

(1) A steel foil according to an aspect of the present invention includes a rolled steel foil and a Ni having <111>//RD texture adheres on an outermost layer of the rolled steel foil.

(2) Regarding the steel foil according to (1), a <111> pole density in an inverse pole figure of a rolling direction in the Ni may be 3.0 or more and 6.0 or less.

(3) Regarding the steel foil according to (1) or (2), the Ni may include a sub-boundary which is a grain boundary between two grains in which a relative misorientation is 2° or more and 5° or less.

(4) Regarding the steel foil according to (3), when a length of the sub-boundary is sub-boundary length L5 and a length of a high-angle boundary, which is a grain boundary between two grains in which a relative misorientation is 15° or more, is a grain boundary length L15, an average of a ratio L5/L15 may be 0.5 or more and 5.0 or less in the texture of the Ni.

(5) Regarding the steel foil according to any one of (1) to (4), a deposition amount of the Ni may be 0.3 g/m$^2$ or more and 5 g/m$^2$ or less.

(6) Regarding the steel foil according to any one of (1) to (5), a tensile strength of the rolled steel foil may be 600 MPa or more and 1,200 MPa or less.

(7) A method for manufacturing a steel foil according to any one of (1) to (6) includes Ni-plating a steel sheet with a Ni, recrystallization-annealing the steel sheet plated with the Ni after the Ni-plating so that a recrystallization is generated by an annealing, and cold-rolling the steel sheet plated with the Ni under a cumulative rolling reduction of 70% or more and 98% or less after the recrystallization-annealing so that a steel foil having a thickness of 100 μm or less is obtained.

(8) Regarding the method for manufacturing a steel foil according to (7), the deposition amount of the Ni of 1 g/m$^2$ or more and 40 g/m$^2$ or less may be plated to the steel sheet in the Ni-plating.

The method for manufacturing a steel foil according to (7) or (8) may further include re-annealing the steel foil at a temperature of 600° C. or less after the cold-rolling.

Effect of the Invention

According to the present invention, it is possible to obtain a steel foil which is thin, high in strength, lightweight, and economic.

EMBODIMENTS OF THE INVENTION

A steel foil according to an embodiment includes a rolled steel foil as a base material, and a Ni having a predetermined texture which is arranged on an outermost layer of the rolled steel foil. The reason that the rolled steel foil is used as the base material is that the rolled steel foil is advantageous from the viewpoint of cost and strength, compared to an electrolytic foil, and as described later, rolling is advantageous to control a texture of Ni.

The steel foil according to the embodiment has a Ni having <111>//RD texture on the surface thereof. Here, <111>//RD means that a <111> orientation of the Ni in a face-centered cubic (FCC) structure is parallel to a rolling direction.

By such a configuration, both cost and performance can reach an excellent level in industrial applications. That is, since an amount of the Ni required for providing sufficient corrosion resistance, metal elution resistance during overdischarge, and stability in a negative electrode potential can be minimized, the configuration is advantageous even in cost.

The reason that such an effect can be obtained with a small amount of the Ni is not absolutely evident, but it is assumed that is attributable to improvement in uniformity and coatability of the Ni. Since the Ni has the FCC structure and a plane, in which the density of atoms is the highest, is the {111} plane therefore, a dense Ni layer is formed by setting the texture of the Ni to be the <111>//RD.

In addition, the {111} plane is referred to as a "slip plane". Since the {111} plane can be oriented preferentially by plastic working including cold-rolling, the aforementioned texture can be controlled by using a rolling process.

To specify the Ni texture of the embodiment, an electron backscatter diffraction (EBSD) method can be used. Specifically, a crystal orientation of an originating point of a diffraction pattern is continuously measured by using an EBSD pattern that can be obtained from a surface of a highly inclined (70°) sample in a scanning electron microscope (SEM).

The EBSD pattern has a property in that the information depth is very shallow. The depth depends on some conditions, but is merely several tens of nm. Accordingly, only a Ni crystal orientation of the outermost layer can be specified by performing an EBSD measurement from the sheet plane direction. Further, it is possible to obtain an inverse pole figure from the EBSD pattern to examine a pole density.

Figure 1A:
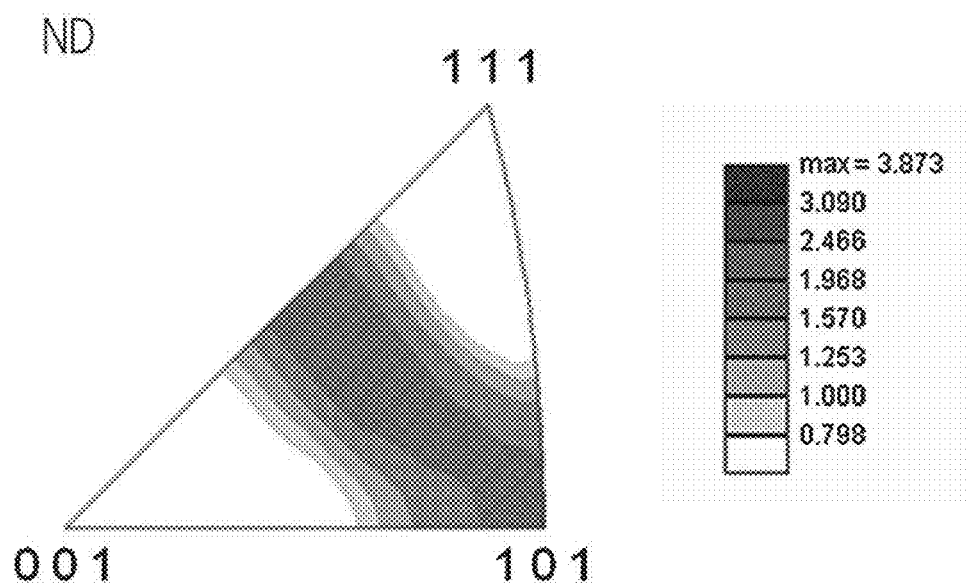
FIG. 1A is a view illustrating an example of a Ni texture (inverse pole figure) according to the present invention measured by an EBSD method, and specifically, an inverse pole figure in an ND, that is, a normal direction of a sheet surface.
Figure 1B:
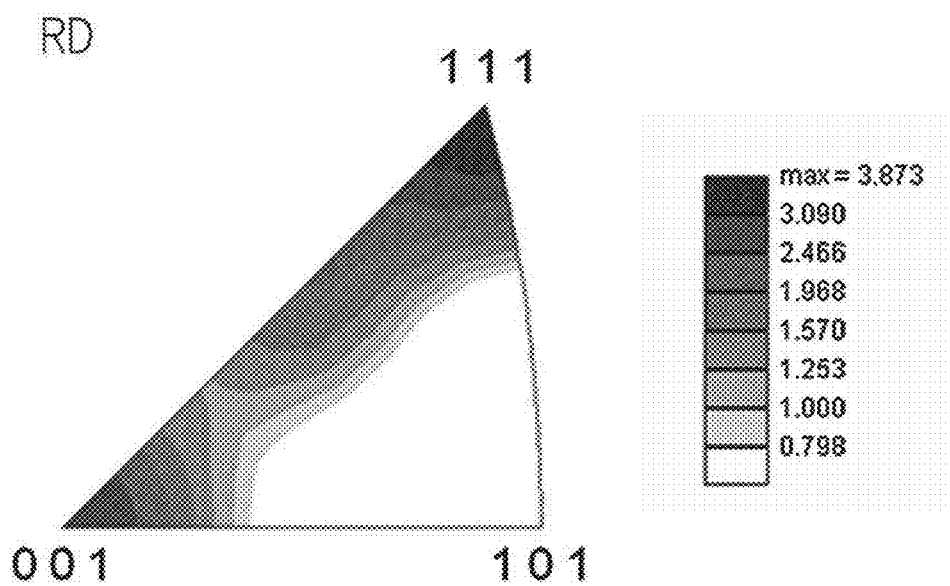
FIG. 1B is a view illustrating an example of the Ni texture (inverse pole figure) according to the present invention measured by the EBSD method, and specifically, an inverse pole figure in an RD, that is, a rolling direction.
Figure 1C:
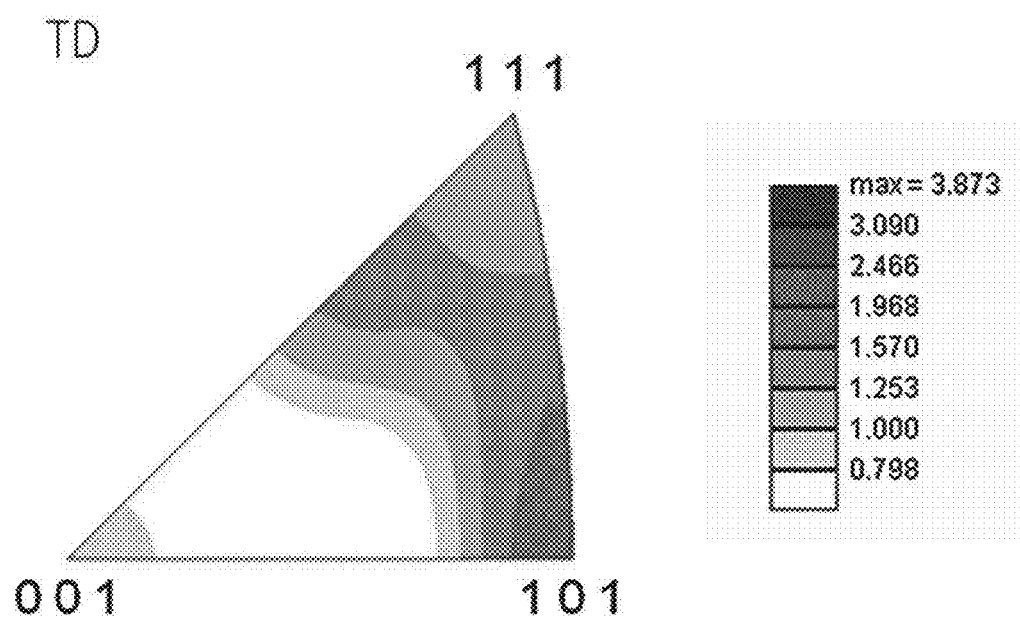
FIG. 1C is a view illustrating an example of the Ni texture (inverse pole figure) according to the present invention measured by the EBSD method, and specifically, an inverse pole figure in a TD, that is, a direction perpendicular to the rolling direction.

FIGS. 1A to 1C are views illustrating examples of the Ni texture (inverse pole figure) of the embodiment using the EBSD method. FIGS. 1A to 1C are views illustrating states in which the statistical bias of the crystal orientation is not present with respect to each of a normal direction of the sheet plane (ND), a rolling direction of the sheet plane (RD), and a direction perpendicular to the rolling direction (TD), that is, the pole density in a random state is set to 1, and the texture is expressed by contour lines. FIG. 1A illustrates an inverse pole figure in the ND, FIG. 1B illustrates an inverse pole figure in the RD, and FIG. 1C illustrates an inverse pole figure in the TD.

From the drawings, it is understood that an orientation integration degree of a <111> or <001> orientation of a target sample in the RD is high. Referring to the scale of the contour lines collectively illustrated in FIGS. 1A to 1C, since the scale of the pole density of the <111> orientation in the RD is 3.09 to 3.873 and the scale of the pole density of the <001> orientation in the RD is 2.466 to 3.09, it is found that the target sample is characterized by the integration of the <111> orientation in the RD. Regarding the ND, the integration toward sides connecting from <101> to <001> and <111> (that is, from <101> to <112>) is observed and regarding the TD, the integration of the <101> orientation is observed. However, referring to the scale of the contour lines, it is found that the respective pole density is less than 2. Accordingly, it cannot be considered that the characteristic textures are formed in the ND and the TD Such an examination was performed on the Ni texture or samples having different performances. As a result, if the pole density of the <111> orientation in the RD was 3.0 or more, it was determined that good properties could be obtained. In addition, the pole density of the <111> orientation in the present invention is defined as a maximum value of the pole density in a range within 5° from <111>. The maximum value of the pole density of the <111> orientation in the RD is not particularly limited, but usually, a value of about 6 or more is not easily obtained. Therefore, the upper limit of the pole density of the <111> orientation in the RD is substantially 6.0.

The Ni in the embodiment desirably includes a sub-boundary other than a usual grain boundary. Usually, a boundary between two grains in which a relative misorientation (misorientation) is 15° or more is considered as a grain boundary. However, the sub-boundary represents a boundary between two grains in which a relative misorientation (misorientation) is less than 15°, and is introduced by the plastic working of the Ni.

If the Ni includes the sub-boundary in which a misorientation is 5° or less, corrosion resistance, metal elution resistance during over-discharge, and stability in a negative electrode potential are improved. To specify the state of the sub-boundary, that is, to specify the sub-boundary in which a misorientation is 5° or less, and the grain boundary in which a misorientation is 15° or more, an EBSD method can be used.

Figure 2A:
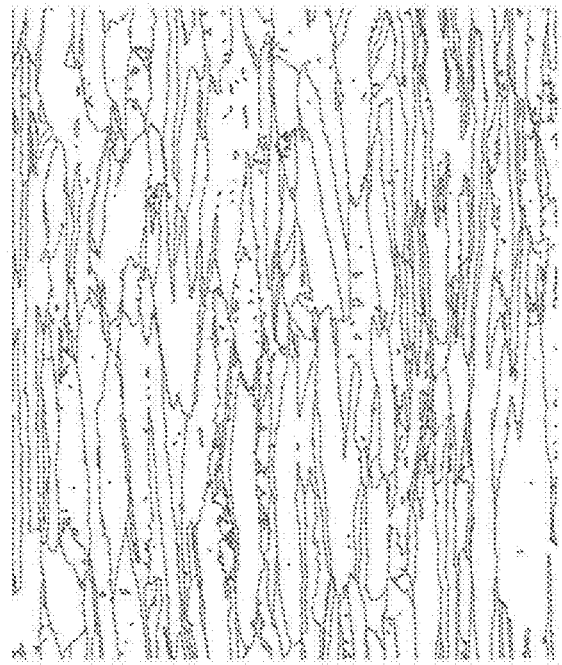
FIG. 2A is a view illustrating an example of a high-angle boundary which is a grain boundary between two grains in which a misorientation (relative misorientation) is 15° or more among Ni grain boundaries according to the present invention measured by the EBSD method (when a vertical direction of a paper plane is RD, and a horizontal direction is TD, the visual field of RD is 120 μm and the visual field of TD is 100 μm).
Figure 2B:
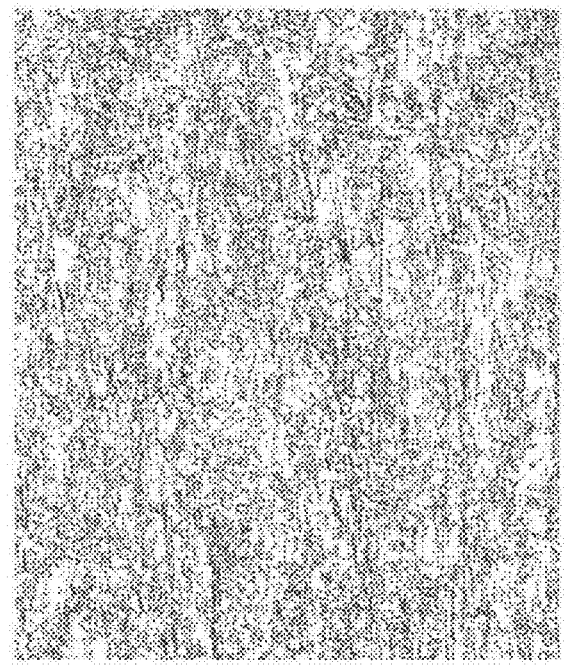
FIG. 2B is a view illustrating an example of a sub-boundary which is a grain boundary between two grains in which a misorientation (relative misorientation) is 2° or more and 5° or less among the Ni grain boundaries according to the present invention measured by the EBSD method (when a vertical direction of a paper plane is RD, and a horizontal direction of a paper plane is TD, the visual field of RD is 120 μm and the visual field of TD is 100 μm).

FIGS. 2A and 2B show examples of the Ni grain boundaries in the embodiment by the EBSD method (when a vertical direction of a paper plane is RD, and a horizontal direction of a paper plane is TD, a visual field of the RD is 120 μm and a visual field of the TD is 100 μm). FIG. 2A shows a high-angle boundary recognized as a grain boundary in which a misorientation is 15° or more and FIG. 2B shows a sub-boundary in which a misorientation is 2° or more and 5° or less.

In addition, generally, since there are large errors in the measurement of the sub-boundary in which a misorientation is less than 2°, the measurement of the sub-boundary of 5° or less is performed by measuring the sub-boundary in which a misorientation is 2° or more and 5° or less. A grain boundary in the twin crystal relationship is also shown as it is without being removed. By such a method, a sub-boundary length (L5) in which a misorientation is 5° or less and a grain boundary length (L15) in which a misorientation is 15° or more are measured in an arbitrary visual field using image processing software in an EBSD apparatus to calculate a ratio of "L5/L15". L5/L15 is desirably 0.5 or more from the viewpoint of negative electrode stability. The upper limit of L5/L15 is not particularly limited, but usually, an upper limit of about 5 or more is not easily obtained. Therefore, the upper limit of L5/L15 is substantially 5.0.

In addition, the Ni of the outermost layer of the steel foil according to the embodiment may have the FCC structure, and for example, Fe or the like may be dissolved therein. In the Ni in which Fe or the like is dissolved, the pole density, the grain boundary and the sub-boundary can be specified by the aforementioned method and definition.

A deposition amount of Ni on the surface of the steel foil according to the embodiment is desirably 0.3 g/m² or more. If the deposition amount of Ni is 0.3 g/m² or more, sufficient corrosion resistance, metal elution resistance during over-discharge and stability in a negative electrode potential can be provided. If the deposition amount of Ni is less than 0.3 g/m², above-described properties cannot be sufficiently obtained, and also, the texture is not easily specified by the EBSD method.

The upper limit of the deposition amount of Ni is not particularly limited, but is preferably 5 g/m² or less in consideration of cost. The present invention has a feature that a significant effect can be obtained even with such a small deposition amount of Ni.

In the case Ni is applied in the related art, unless the deposition amount of Ni is at least about 9 g/m² or more, an effect of improving metal elution resistance during over-discharge and stability in a negative electrode potential cannot be expected. Moreover, the improvement effect in the related art is smaller than the improvement effect of the present application. In the related art, the deposition amount of Ni is increased and only a slight improvement effect can be obtained. Thus, if the deposition amount of Ni is increased to about 90 g/m², a remarkable improvement effect as same as that of the present invention cannot be obtained.

The tensile strength of the steel foil in the embodiment is desirably 600 MPa to 1,200 MPa. Here, the tensile strength represents a value at room temperature. If the tensile strength of the steel foil is less than 600 MPa, there may a problem in that the steel foil is deformed or the active material formed on the steel foil is exfoliated due to expansion and constriction of the active material accompanying charging/discharging. This tendency becomes remarkable in a high capacity negative electrode active material. If the tensile strength of the steel foil is more than 1,200 MPa, it is difficult to handle the steel foil.

The steel foil according to the embodiment preferably has an elongation to some extent, but if the steel foil does not have an elongation (at an immeasurable level), the effect of the present invention is not impaired.

Generally, when a current-collecting foil is coated with an active material to prepare an electrode, a heat treatment at a maximum temperature of about 400° C. is performed in some cases. The steel foil according to the embodiment has good heat resisting property, and even when the heat treatment at about 400° C. is performed, the maximum reduction of the tensile strength is about 10%. In addition, there is no great change in the texture of the Ni.

Generally, a foil has a thickness of 100 μm or less, but the steel foil in the embodiment has a thickness of 20 μm or less, which is more desirable. This is because a thin current-collecting foil is desired as the size and weight of a battery is reduced. The lower limit is not particularly limited, but in consideration of cost and uniformity in thickness, usually, the lower limit is desirably 5 μm or more.

The surface roughness of the steel foil in the embodiment is not particularly limited, but is desirably about 0.005 to 0.5 μm in terms of Ra. Here, the Ra represents a roughness parameter according to JIS B 0601. Generally, if the roughness is large, an anchor effect is increased and adhesion of the active material to be coated is improved. However, if the roughness is excessively large, the thickness of an active material layer easily becomes uniform and this easily causes a problem when the thickness of the active material layer is reduced. Contrarily, in the steel foil in the embodiment including a specific Ni on the outermost layer, even if the roughness is small, adhesion between the steel foil and the active material can be secured and thus, restriction on the roughness can be widened.

Figure 3:
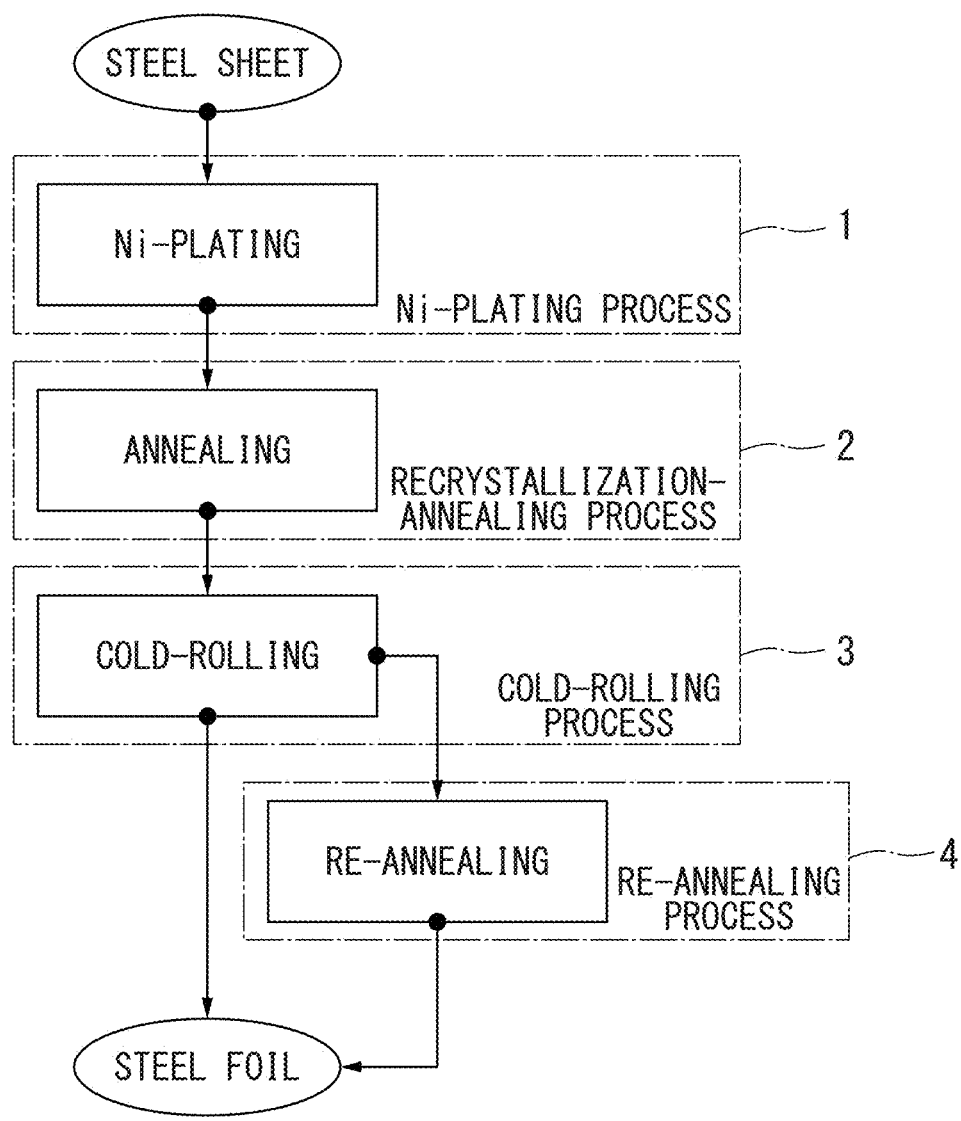
FIG. 3 is a flowchart illustrating a method for manufacturing the steel foil according to the present invention.

Next, a method for manufacturing the steel foil according to the embodiment will be described. As shown in FIG. 3, the method for manufacturing the steel foil according to the embodiment includes a Ni-plating process in which a steel sheet is plated with a Ni, a recrystallization-annealing process in which Ni is annealed so as to be recrystallized after the Ni-plating process and a cold-rolling process in which the steel sheet is cold-rolled so as to be a steel foil. By undergoing such processes, a foil including a Ni having a specific texture on the outermost layer according to the embodiment can be manufactured. In addition, after the cold-rolling process, the steel foil can be re-annealed in the re-annealing process so as to adjust the strength of the foil (tensile strength of the steel foil).

(Steel Sheet)

The steel sheet used in the manufacturing of the steel foil according to the embodiment is not particularly limited and any of a hot-rolled steel sheet, a cold-rolled steel sheet and a cold-rolled annealed steel sheet can be used. However, due to rolling performance, it is difficult to make the hot-rolled steel sheet to be a foil having a thickness of 100 μm or less by cold-rolling which will be described later in many cases. Even if the foil is made by using the hot-rolled steel sheet, the foil is inefficient and uneconomical. Accordingly, the cold-rolled steel sheet or the cold-rolled annealed steel sheet may be used in the manufacturing of the steel foil according to the embodiment.

In the manufacturing of the steel foil according to the embodiment, the component composition of the steel foil is not particularly limited. In order to achieve high-strengthening, or improve corrosion resistance, a large amount of a specific element is not necessarily added to the steel sheet. So-called high strength steel can also be applied, but a steel sheet having a general component composition is preferably used from the viewpoint of securing rollability which will be described later. An example of the component composition is as follows. "%" means "mass %".

C: 0.0001% to 0.1%,
Si: 0.001% to 0.5%,
Mn: 0.01% to 1%,
P: 0.001% to 0.05%
S: 0.0001% to 0.02%,
Al: 0.0005% to 0.2%,
N: 0.0001% to 0.004%, and
Remainder: Fe and unavoidable impurities.

(C: 0.0001% to 0.1%)

C is an element that improves the strength of the steel, but if an excessive amount of C is contained, the strength is excessively increased, and thus, the rollability is reduced. Since the steel foil according to the embodiment is highly strengthened by work hardening under a high cumulative rolling reduction as described later, the original steel sheet may be mild in consideration of easiness of rolling. Accordingly, the upper limit of the C content may be 0.1%. The lower limit of the C content does not need to be particularly limited, but the lower limit of the C content is preferably 0.0001% in consideration of refining cost. The C content is more preferably 0.001% to 0.01%.

(Si: 0.001% to 0.5%)

Si is an element that improves the strength of the steel, but if an excessive amount of Si is contained, the strength of the steel is excessively increased, and thus, the rollability of the steel is reduced. Accordingly, the upper limit of the Si content is preferably 0.5%. The lower limit of the Si content is not particularly limited, but the lower limit of the Si content is preferably 0.001% in consideration of refining cost. In order to secure higher rollability, the Si content is preferably 0.001% to 0.02%.

(Mn: 0.01% to 1%)

Mn is an element that improves the strength of the steel, but if an excessive amount of Mn is contained, the strength of the steel is excessively increased, and thus, the rollability is reduced. Accordingly, the upper limit of the Mn content is preferably 1%. The lower limit of the Mn content does not need to be particularly limited, but the lower limit of the Mn content is preferably 0.01% in consideration of refining cost. In order to secure higher rollability, the Mn content is more preferably 0.01% to 0.5%.

(P: 0.001% to 0.05%)

P is an element that improves the strength of the steel, but if an excessive amount of P is contained, the strength of the steel is excessively increased, and thus, the rollability is reduced. Accordingly, the upper limit of the P content is preferably 0.05%. The lower limit of the P content does not need to be particularly limited, but the lower limit of the P content is preferably 0.001% in consideration of refining cost. In order to secure higher rollability, the P content is more preferably 0.001% to 0.02%.

(S: 0.0001% to 0.02%)

Since S is an element that decreases hot workability and corrosion resistance of the steel, the less S is more preferable. The upper limit of the S content is preferably 0.02%. The lower limit of the S content does not need to be particularly limited, but the lower limit of the S content is preferably 0.0001% in consideration of refining cost. In order to secure higher rollability, and obtain superiority in cost, the S content is more preferably 0.001% to 0.01%.

(Al: 0.0005% to 0.2%)

Al is added as a deoxidizing element in the steel. In order to obtain a deoxidizing effect, the Al content is preferably 0.0005% or more. However, if an excessive amount of Al is contained, the rollability of the steel is reduced. Thus, the upper limit of the Al content is preferably 0.2%. In order to secure higher rollability, the Al content is more preferably 0.001% to 0.1%.

(N: 0.0001% to 0.004%)

Since N is an element that decreases hot workability and workability of the steel, the less N is more preferable. Therefore, the upper limit of the N content is preferably 0.004%. The lower limit of the N content does not need to be particularly limited, but the lower limit of the N content is preferably 0.0001% in consideration of refining cost. In order to obtain superiority in cost, the N content is more preferably 0.001% to 0.01%.

(Remainder: Fe and Unavoidable Impurities)

The remainder of the steel sheet includes Fe and unavoidable impurities, and further, Ti and/or Nb can be added to the steel sheet. Ti and/or Nb fix(es) C and N in the steel as a carbide and a nitride and is (are) capable of improving the workability of the steel. In this case, the Ti content is preferably 0.01% to 0.8%, and the Nb content is preferably 0.005% to 0.05%.

Further, the steel used in manufacturing the steel foil according to the embodiment may additionally include B, Cu, Ni, Sn, Cr and the like within a range in which the effect of the embodiment is not impaired.

(Ni-Plating Process)

In order to obtain the steel foil according to the present invention, the steel sheet is subjected to Ni-plating, but the steel sheet at this time may be a cold-rolled steel sheet as the steel sheet is cold-rolled, or a cold-rolled steel sheet after annealing. A method for Ni-plating the steel sheet is not particularly limited, but electro plating is preferable from the viewpoint of cost. A plating bath which is used in the electro plating is not particularly limited, but a Watts bath including nickel sulfate, nickel chloride, and boric acid is suitable from the viewpoint of manufacturing cost and deposition amount controllability. As the Watts bath, for example, a Watts bath including 200 to 400 g/l of nickel sulfate, 20 to 100 g/l of nickel chloride and 5 to 50 g/l of boric acid can be used.

Here, Ni-plating which is subjected to a steel may be alloy plating as far as that recrystallization is generated by an annealing treatment which will be described later and the plating is softened. For example, the Ni-plating may be Ni—Fe alloy plating or Ni—Co alloy plating. However, alloy plating in which a compound is precipitated and thus hardened during the annealing treatment, for example, Ni—P alloy plating cannot be applied.

In the Ni-plating process, the deposition amount of Ni plated to the steel sheet is desirably 1 g/m$^2$ or more. If the deposition amount of Ni is less than 1 g/m$^2$, the coverage is reduced by the following cold-rolling, and corrosion resistance, metal elution resistance, and stability in a negative electrode potential are reduced in some cases. Further, the deposition amount of Ni on the steel foil may be less than 0.3 g/m$^2$ by the following cold-rolling. The upper limit of deposition amount of Ni is restricted due to cost, but a preferable upper limit of deposition amount of Ni is usually 40 g/m$^2$ or less. The deposition amount of Ni before cold-rolling is more preferably 10 to 30 g/m$^2$. However, if the deposition amount of Ni before cold-rolling is more than 40 g/m$^2$, a desirable steel foil can be obtained regarding a metallographic structure and properties.

(Recrystallization-Annealing Process)

The steel sheet plated with Ni is subjected to the recrystallization-annealing in the recrystallization-annealing process after the steel sheet is subjected to the Ni-plating in the Ni-plating process. Here, the recrystallization means (1) recrystallization of both the steel sheet and the Ni-plating in a case in which the original sheet before the Ni-plating is an unannealed sheet and (2) recrystallization of the Ni-plating in a case in which the original sheet before the Ni-plating is an annealed sheet. If the recrystallization temperature of the Ni-plating is compared with the recrystallization temperature of the steel sheet, the recrystallization temperature of the Ni-plating is usually lower than the recrystallization temperature of the steel sheet. This is because strain introduced in the Ni-plating in the Ni-plating process becomes a driving force for recrystallization.

Whether or not the recrystallization is generated can be confirmed by observing the structure or measuring a change in hardness. For example, while the Vickers hardness of the Ni-plating in the state that the plating is formed by electro plating is about 250 to 300, if the recrystallization is generated by annealing, the Vickers hardness of the Ni-plating is reduced to 200 or less. Appropriate annealing conditions are determined by a product of temperature and time. That is, if the temperature is high, annealing time is necessary relatively short. If the temperature is low, annealing time is necessary relatively long. As specific annealing methods, there is box annealing and continuous annealing.

In the box annealing, a short-time treatment cannot be performed due to facility properties. Accordingly, in the case of the box annealing, a treatment is usually performed for a long time such as several hours to several days. During the box annealing, the temperature of the sheet is low and specifically, is set to 500° C. to 700° C. in many cases. In the continuous annealing, a short-time treatment is preferably performed so as to improve productivity. Accordingly, in the case of the continuous annealing, a treatment is usually performed for a short time such as several seconds to several minutes in many cases. In the continuous annealing, the temperature of the sheet is high and specifically, is set to 700° C. to 900° C. in many cases.

If the steel sheet is not subjected to the recrystallization-annealing, the Ni-plating is easily exfoliated in the subsequent cold-rolling process, and it is difficult to obtain the specific Ni texture of <111>//RD. In addition, an average value of L5/L15 is less than 0.5 in some cases.

(Cold-Rolling Process)

The Ni-plated steel sheet which has undergone the recrystallization-annealing is subjected to cold-rolling so as to manufacture a foil having a thickness of 100 µm or less, and preferably, 20 µm or less. By undergoing the procedures, it is possible to obtain a high strength steel foil having a <111>//RD texture and a Ni in which an average of L5/L15 is 0.5 or more on the outermost layer.

The cumulative rolling reduction of the cold-rolling is 70% or more and preferably, 90% or more. Here, the cumulative rolling reduction is a percentage of a cumulative rolling reduction amount to an initial thickness at an entrance of a rolling stand (a difference between a thickness at the entrance before an initial pass and a thickness at the exit after a final pass). If the cumulative rolling reduction is small, a desired Ni texture cannot be obtained and the strength of the foil is less than 600 MPa in some cases. In addition, the average of L5/L15 is less than 0.5 in some cases. The upper limit of the cumulative, rolling reduction is not particularly limited, but the limit is about 98% in a normal rolling capacity. The cold-rolling is performed by one or plural times of passes.

Here, it is possible to control the surface roughness of the foil by adjusting roll roughness during the cold-rolling.

(Re-Annealing Process)

After the rolling, the strength of the foil can be adjusted by performing re-annealing. However, if a re-annealing temperature is too high, the Ni texture may be destroyed and there is a concern that the strength of the foil may be reduced. Accordingly, a re-annealing temperature is necessary to be about 600° C. or lower. In addition, if the re-annealing is performed, the strength of the foil is less than the above-described preferable range (600 MPa to 1,200 MPa) in some cases, but this does not cause impairment in corrosion resistance, metal elution resistance and negative electrode stability.

In the embodiment, in order to satisfy strength, corrosion resistance, metal elution resistance, negative electrode stability and cost at a high level, as described above, it is important to control the deposition amount of Ni before the cold-rolling and the cumulative rolling reduction in the cold-rolling in specific ranges.

Further, it is desirable to adjust the deposition amount of Ni before the rolling depending on the cumulative rolling reduction. Specifically, when the cumulative rolling reduction is the higher, the deposition amount of N is preferably lower before the rolling. If the deposition amount of Ni is the same, the higher cumulative rolling reduction makes properties of the steel foil to be more favorable. This is because that a more preferable texture is formed, though the deposition amount of Ni on the outermost layer after the steel sheet is rolled into a foil shape is reduced. Therefore, if the deposition amount of Ni is small in the case in which the cumulative rolling reduction is high, it is possible to obtain a foil having good performance at a low cost.

The inventors have experimentally confirmed that a desirable relationship between a cumulative rolling reduction in cold-rolling (unit: %, hereinafter, referred to as "X") and a deposition amount of Ni before cold-rolling (unit: g/m², hereinafter, referred to as "Y") is expressed by the following Expression (1). The relational expression is preferably satisfied. If the relational expression is satisfied, better over-discharge solubility and/or negative electrode stability are obtained.

$$Y \geq (-6/7) \times X + 93 \quad (1)$$

EXAMPLES

Next, examples of the present invention will be described, but the conditions of the examples are exemplary examples adopted to confirm the practicability and effect of the present invention. The present invention is not limited to the examples. The present invention can adopt various conditions to accomplish the object of the present invention without departing from the gist of the present invention.

Examples 1 to 14 and 16 to 27, Reference Example 15, and Comparative Example 32

Cold-rolled steel sheets (unannealed materials) having component compositions shown in Table 1 were subjected to degreasing, pickling, and then, Ni-plating by an electro plating method.

TABLE 1

| MARK | STEEL COMPONENT MASS % | | | | | | | | |
|------|------|------|------|------|------|------|------|------|------|
|      | C | Si | Mn | P | S | Al | N | Ti | Nb |
| Al-k | 0.01 | 0.007 | 0.11 | 0.012 | 0.009 | 0.09 | 0.002 | — | — |
| IF   | 0.0019 | 0.009 | 0.09 | 0.012 | 0.0042 | 0.045 | 0.002 | 0.02 | 0.019 |

Using a plating bath including 320 g/l of nickel sulfate, 70 g/l of nickel chloride, and 40 g/l of boric acid, Ni-plating was performed at various deposition amounts at a bath temperature of 65° C. and at a current density of 20 A/dm². Next, continuous annealing was performed under a 5% $H_2$ (remainder: $N_2$) atmosphere at a predetermined temperature and for a predetermined time. Finally, cold-rolling was performed under a predetermined cumulative rolling reduction so as to manufacture foils. Each condition of the thickness of the original plate, deposition amount of Ni, annealing condition and cumulative rolling reduction is shown in Table 2.

TABLE 2

| | | ORIGINAL SHEET COMPONENT | ORIGINAL SHEET THICKNESS mm | Ni-PLATING AMOUNT g/m² | ANNEALING CONDITION AFTER PLATING TEMPERATURE (° C.) × TIME (s) | ROLLING REDUCTION % | FOIL THICKNESS μm | REMARKS |
|---|---|---|---|---|---|---|---|---|
| EXAMPLES | 1 | Al-k | 0.3 | 9 | 750° C. × 60 sec | 90 | 30 | |
| | 2 | Al-k | 0.3 | 9 | 750° C. × 60 sec | 94 | 18 | |
| | 3 | Al-k | 0.3 | 9 | 750° C. × 60 sec | 95 | 15 | |
| | 4 | Al-k | 0.3 | 15 | 750° C. × 60 sec | 98 | 6 | |
| | 5 | Al-k | 0.3 | 27 | 750° C. × 60 sec | 90 | 30 | |
| | 6 | Al-k | 0.3 | 27 | 750° C. × 60 sec | 94 | 18 | |
| | 7 | Al-k | 0.3 | 11 | 750° C. × 60 sec | 94 | 18 | |
| | 8 | Al-k | 0.3 | 13 | 750° C. × 60 sec | 94 | 18 | |
| | 9 | Al-k | 0.3 | 13 | 750° C. × 60 sec | 92 | 24 | |
| | 10 | Al-k | 0.3 | 15 | 750° C. × 60 sec | 92 | 24 | |
| | 11 | Al-k | 0.3 | 27 | 750° C. × 60 sec | 95 | 15 | |
| | 12 | Al-k | 0.3 | 27 | 750° C. × 60 sec | 97 | 9 | |
| | 13 | Al-k | 0.3 | 10 | 750° C. × 60 sec | 97 | 9 | |
| | 14 | Al-k | 0.3 | 35 | 750° C. × 60 sec | 97 | 9 | |
| REFERENCE EXAMPLE | 15 | Al-k | 0.2 | 50 | 750° C. × 60 sec | 90 | 20 | |
| EXAMPLES | 16 | Al-k | 0.2 | 10 | 750° C. × 60 sec | 95 | 10 | |
| | 17 | Al-k | 0.2 | 12 | 750° C. × 60 sec | 95 | 10 | |
| | 18 | Al-k | 0.4 | 18 | 750° C. × 60 sec | 95 | 20 | |
| | 19 | Al-k | 0.15 | 18 | 750° C. × 60 sec | 90 | 15 | |
| | 20 | Al-k | 0.3 | 18 | 750° C. × 60 sec | 85 | 45 | |
| | 21 | Al-k | 0.2 | 1 | 750° C. × 60 sec | 70 | 60 | |
| | 22 | IF | 0.1 | 15 | 820° C. × 40 sec | 70 | 30 | |
| | 23 | IF | 0.1 | 10 | 820° C. × 40 sec | 70 | 30 | |
| | 24 | IF | 0.2 | 18 | 820° C. × 40 sec | 80 | 40 | |
| | 25 | IF | 0.2 | 10 | 820° C. × 40 sec | 80 | 40 | |
| | 26 | IF | 0.2 | 15 | 820° C. × 40 sec | 90 | 20 | |
| | 27 | IF | 0.2 | 15 | 820° C. × 40 sec | 95 | 10 | |

TABLE 2-continued

| | | ORIGINAL SHEET COMPONENT | ORIGINAL SHEET THICKNESS mm | Ni-PLATING AMOUNT g/m² | ANNEALING CONDITION AFTER PLATING TEMPERATURE (° C.) × TIME (s) | ROLLING REDUCTION % | FOIL THICKNESS μm | REMARKS |
|---|---|---|---|---|---|---|---|---|
| | 28 | IF | 0.2 | 15 | 820° C. × 40 sec | 95 | 10 | RE-ANNEALING AFTER FOIL-ROLLING (600° C. × 30 sec) |
| | 29 | Al-kX | 0.2 | 16 | 600° C. × 60 sec | 90 | 20 | Ni-PLATING TO ANNEALED SHEET |
| COMPARATIVE EXAMPLES | 30 | Al-k | 0.3 | 0 | 750° C. × 60 sec | 95 | 15 | WITHOUT Ni |
| | 31 | Al-k | 0.1 | 5 | 750° C. × 60 sec | 0 | 100 | WITHOUT ROLLING |
| | 32 | Al-k | 0.1 | 5 | 750° C. × 60 sec | 60 | 40 | |
| | 33 | Al-kX | 0.2 | 9 | — | 90 | 20 | ROLLING AFTER Ni-PLATING WITHOUT ANNEALING |
| | 34 | Al-k | 0.02 | 9 | — | — | 20 | Ni-PLATING TO FOIL |
| | 35 | Cu FOIL | — | — | — | — | 20 | Cu FOIL |
| | 36 | Al-kX | 0.2 | 9 | 500° C. × 60 sec | 90 | 20 | |

Example 28

A foil of Example 27 was subjected to a heat treatment again at a holding temperature of 600° C. for a holding time of 30 sec under a 5% $H_2$ (remainder: $N_2$) atmosphere.

Example 29

A cold-rolled steel sheet having a component composition of Al-k shown in Table 1 was subjected to continuous annealing at a holding temperature of 750° C. for a holding time of 60 sec under a 5% $H_2$ (remainder: $N_2$) atmosphere. Next, the steel sheet was subjected to Ni-plating, heat treatment, and cold-rolling so as to manufacture a foil. The conditions for the Ni-plating were the same as the conditions of the above plating. The heat treatment after plating was performed at a holding temperature of 600° C. for a holding time of 60 sec under a 5% $H_2$ (remainder: $N_2$) atmosphere.

Comparative Example 30

A cold-rolled steel sheet (unannealed material) having a component composition of Al-k shown in Table 1 was used and subjected to a continuous annealing treatment at a predetermined temperature and for a predetermined time under a 5% $H_2$ (remainder: $N_2$) atmosphere. Then, cold-rolling was performed under a predetermined cumulative rolling reduction so as to manufacture a foil.

Comparative Example 31

A cold-rolled steel sheet (unannealed material) having a component composition of Al-k shown in Table 1 was used and subjected to Ni-plating in the same conditions as in the above example, and a continuous annealing treatment at a predetermined temperature and for a predetermined time under a 5% $H_2$ (remainder: $N_2$) atmosphere.

Comparative Example 33

A cold-rolled steel sheet having a component composition of Al-k shown in Table 1 was subjected to continuous annealing at a holding temperature of 750° C. for a holding time of 60 sec under a 5% $H_2$ (remainder: $N_2$) atmosphere. Next, Ni-plating and cold-rolling were performed so as to manufacture a foil. As for a plating bath, 2 g/l of saccharin and 0.2 g/l of 2-butyne-1,4-diol, as a gloss additive, are added to a bath in the above condition. Other conditions for plating were the same as the above conditions.

Comparative Example 34

A foil having a thickness of 20 μm and a component composition of Al-k shown in Table 1 was used and subjected to Ni-plating. That is, in the Ni-plating of Comparative Example 34, neither recrystallization-annealing nor cold-rolling was performed. The conditions for the Ni-plating were the same as the above conditions.

Comparative Example 35

A commercially available Cu foil (oxygen free copper) was evaluated.

Comparative Example 36

A cold-rolled steel sheet having a component composition of Al-k shown in Table 1 was subjected to Ni-plating, and subjected to continuous annealing treatment at a holding temperature of 500° C. for a holding time of 60 sec under a 5% $H_2$ (remainder: $N_2$) atmosphere. Then, cold-rolling was performed to manufacture a foil. The conditions for a plating bath and plating were the same as in Comparative Example 33.

(Evaluation Method)

Ni-deposition amount: The amount was determined by an X-ray fluorescence analyzer.

Strength of foil: A tensile test according to JIS Z 2241 was conducted by using JIS 13B tensile test pieces which were gathered in a direction parallel to the rolling direction so as to obtain tensile strength. The tensile strength of each of the steel foils which are samples as they are and steel foils after heating at 400° C. for 30 minutes was obtained. The tensile strength after heating was obtained as a reference value because the steel foils might be heated in a battery-manufacturing process. However, since the values of tensile strength required for the steel foils after heating varied depending on the type of batteries, whether the tensile strength of the steel foils after heating was acceptable or not was not particularly determined.

Ni state (EBSD method): The samples were subjected to a pretreatment (acetone ultrasonic degreasing) and set to a SEM/EBSD sample stage. In a region of RD direction of 120 μm×TD direction of 100 μm, an orientation measurement was performed at intervals of 0.2 μm. In the measurement, an acceleration voltage was set to 25 kV using a FE-SEM (SU-70, manufactured by Hitachi, Ltd.) equipped with Schottky Electron Gun. OIM system v 5.31 manufactured by TSL solutions Ltd. was used as software for performing an analysis by the EBSD method.

From the inverse pole figure in the RD, a pole density with a random state was set to 1 and a pole density of the <111> plane was obtained. Here, the pole density of the <111> orientation was a maximum value of a pole density in a range within 5° C. or less from <111>.

Using the same method as described above, a length of a sub-boundary (sub-boundary length (L5)) which is a grain boundary between two grains in which a misorientation (relative misorientation) is 2° or more and 5° or less, and a length of a grain boundary (grain boundary length (L15)) which is a grain boundary between two grains in which a relative misorientation is 15° or more were measured to obtain a ratio of L5/L15.

Primary corrosion resistance: The samples were held in a wet environment (60° C., 95% RH) for one week and the external appearance was observed. A sample with no external change was evaluated as Grade "A", a sample with discoloration was evaluated as Grade "B", and a sample in which red rust was generated was evaluated as Grade "C".

Over-discharge solubility: A three-electrode beaker cell was fabricated in a glove box in an argon atmosphere (dew point: −60° C.) for evaluation. An edge and a rear surface of each sample were sealed with a tape and the samples were used as working electrodes. Metal lithium was used as a counter electrode and a reference electrode. As an electrolyte, a solution prepared by dissolving 1 M of $LiPF_6$ into a mixed solvent of ethylene carbonate and diethylene carbonate at a volume fraction of 1:1 was used.

The three-electrode beaker cell was held at 25° C., and scanning was performed in a noble direction from the immersion potential at 5 mV/sec so as to measure the potential in which a current of 0.01 $mA/cm^2$ flowed. Thus, the measured potential was set as a dissolved potential. The dissolved potential was represented as a Li reference potential (V).

Negative electrode stability: A three-electrode beaker cell was fabricated by the same method as above and held at 25° C. Then, scanning was performed in a base direction from the immersion potential at 5 mV/sec to 0 V as the Li reference potential, and then, the scanning was repeated in the noble direction at 0 V. A cycle of scanning to the immersion potential was repeated five times.

The first cycle was excluded since unevenness due to the influence of a surface state and the like was large. Absolute values of the current flowing from the second cycle to the fifth cycle were added to obtain an amount of electricity. The amount of electricity is shown in $mC/cm^2$. The result is shown in Table 3.

TABLE 3

| | | Ni-PLATING AMOUNT OF FOIL $g/m^2$ | FOIL STRENGTH MPa | | Ni STATE (EBSD) | | PRIMARY CORROSION RESISTANCE | OVER-DISCHARGE SOLUBILITY SOLUBILITY POTENTIAL V | NEGATIVE ELECTRODE STABILITY $mC/cm^2$ |
| | | | WITHOUT RE-ANNEALING AFTER FOIL-ROLLING | WITH RE-ANNEALING AFTER FOIL-ROLLING | <111> POLE DENSITY | L5/L15 | | | |
|---|---|---|---|---|---|---|---|---|---|
| EXAMPLES | 1 | 0.9 | 919 | 868 | 3.8 | 1.7 | A | 4.2 | 8 |
| | 2 | 0.54 | 995 | 914 | 4 | 1.9 | A | 4.2 | 8 |
| | 3 | 0.45 | 1052 | 976 | 4.1 | 2.1 | A | 4.2 | 8 |
| | 4 | 0.3 | 1199 | 1098 | 4.4 | 2.6 | A | 4.3 | 7 |
| | 5 | 2.7 | 925 | 887 | 3.9 | 1.6 | A | 4.4 | 6 |
| | 6 | 1.62 | 991 | 948 | 4 | 2 | A | 4.4 | 6 |
| | 7 | 0.66 | 999 | 936 | 4 | 2 | A | 4.2 | 8 |
| | 8 | 0.78 | 998 | 937 | 4.1 | 2 | A | 4.3 | 6 |
| | 9 | 1.04 | 931 | 910 | 4 | 2 | A | 4.2 | 8 |
| | 10 | 1.2 | 926 | 915 | 3.9 | 1.9 | A | 4.3 | 6 |
| | 11 | 1.35 | 1043 | 963 | 4.1 | 2 | A | 4.3 | 6 |
| | 12 | 0.81 | 1155 | 1032 | 4.3 | 2.2 | A | 4.3 | 6 |
| | 13 | 0.3 | 1148 | 1045 | 4.3 | 2.2 | A | 4.3 | 7 |
| | 14 | 1.05 | 1143 | 1067 | 4.3 | 2.3 | A | 4.3 | 6 |
| REFERENCE EXAMPLE | 15 | 5 | 913 | 881 | 3.8 | 1.7 | A | 4.5 | 7 |
| EXAMPLES | 16 | 0.5 | 992 | 964 | 4 | 1.8 | A | 4.3 | 8 |
| | 17 | 0.6 | 992 | 965 | 4.1 | 1.9 | A | 4.3 | 7 |
| | 18 | 0.9 | 1048 | 982 | 4.1 | 2.1 | A | 4.3 | 7 |
| | 19 | 1.8 | 898 | 872 | 3.9 | 1.6 | A | 4.3 | 7 |
| | 20 | 2.7 | 852 | 844 | 3.7 | 1.4 | A | 4.4 | 8 |
| | 21 | 0.3 | 696 | 687 | 3.1 | 1.4 | A | 4 | 9 |
| | 22 | 4.5 | 616 | 602 | 3 | 1 | A | 4.2 | 8 |
| | 23 | 3 | 607 | 601 | 3 | 1 | A | 4.2 | 8 |
| | 24 | 3.6 | 758 | 599 | 3.5 | 1.2 | A | 4.2 | 8 |
| | 25 | 2 | 759 | 602 | 3.4 | 1.3 | A | 4.2 | 8 |
| | 26 | 1.5 | 824 | 775 | 4 | 2 | A | 4.4 | 6 |
| | 27 | 0.75 | 922 | 879 | 4.2 | 2.2 | A | 4.3 | 7 |
| | 28 | 0.75 | 599 | 598 | 4.2 | 0.5 | A | 4.3 | 7 |
| | 29 | 1.6 | 904 | 897 | 3.9 | 1.6 | A | 4.4 | 6 |

TABLE 3-continued

| | | Ni-PLATING AMOUNT OF FOIL g/m² | FOIL STRENGTH MPa | | Ni STATE (EBSD) | | PRIMARY CORROSION RESISTANCE | OVER-DISCHARGE SOLUBILITY POTENTIAL V | NEGATIVE ELECTRODE STABILITY mC/cm² |
|---|---|---|---|---|---|---|---|---|---|
| | | | WITHOUT RE-ANNEALING AFTER FOIL-ROLLING | WITH RE-ANNEALING AFTER FOIL-ROLLING | <111> POLE DENSITY | L5/L15 | | | |
| COMPARATIVE EXAMPLES | 30 | 0 | 1057 | 959 | — | — | C | 3.5 | 40 |
| | 31 | 5 | 356 | 351 | 0.7 | 0.04 | A | 3.8 | 18 |
| | 32 | 2 | 493 | 507 | 2 | 0.4 | A | 3.8 | 16 |
| | 33 | 0.5* | 909 | 801 | ** | ** | C | 3.6 | 36 |
| | 34 | 9 | 805 | 758 | 0.7 | 0.9 | A | 3.7 | 16 |
| | 35 | 0 | 392 | 151 | — | — | B | 3.4 | 8 |
| | 36 | 0.9 | 910 | 801 | ** | ** | C | 3.6 | 34 |

As shown in Table 3, Examples of the present invention exhibited good primary corrosion resistance. In addition, regarding over-discharge solubility, the level of the foils in Examples of the present invention noticeably exceeded the level of the foils in Comparative Examples, and 4 V or more of good properties were obtained. Further, regarding negative electrode stability, Examples of the present invention obtained values in which the amount of electricity was less than 10 mC/cm² which showed a low reactivity (that is, negative electrode stability) at the same level as or more of the Cu foil in Comparative Example. Since the foil of Example 28 was re-annealed after the foil-rolling, the strength of the foil was less than 600 MPa. However, the foil had good primary corrosion resistance, over-discharge solubility resistance, and negative electrode stability. In Reference Example 15, the deposition amount of Ni before the cold-rolling was more than 40 g/m², but the properties were good. In the comparative material, a result of deterioration in at least one characteristic of primary corrosion resistance, over-discharge solubility resistance, and negative electrode stability was exhibited.

INDUSTRIAL APPLICABILITY

According to the present invention, since a negative electrode current collector which is thin, high in strength, lightweight, and economic can be obtained, it is possible to improve performance, stability and economic efficiency of a secondary battery such as a lithium ion battery. Therefore, the present invention has a very high industrial applicability.

BRIEF DESCRIPTION OF THE REFERENCE SYMBOLS

1: NI-PLATING PROCESS
2: RECRYSTALLIZATION-ANNEALING PROCESS
3: COLD-ROLLING PROCESS
4: RE-ANNEALING PROCESS

The invention claimed is:
1. A steel foil comprising:
a rolled steel foil; and
nickel adhering on an outermost layer of the rolled steel foil,
wherein said nickel has a <111>//RD texture, the <111>//RD texture being a structure in which a <111> orientation of said nickel in a face-centered cubic structure is integrated in a rolling direction,
wherein a <111> pole density in an inverse pole figure of the rolling direction in said nickel is 3.0 or more and 6.0 or less, and
wherein a thickness of the steel foil is 5 to 100 μm.
2. The steel foil according to claim 1,
wherein the nickel includes a sub-boundary which is a grain boundary between two grains in which a relative misorientation is 2° or more and 5° or less.
3. The steel foil according to claim 2,
wherein, when a length of the sub-boundary is a sub-boundary length L5 and a length of a high-angle boundary, which is a grain boundary between two grains in which a relative misorientation is 15° or more, is a grain boundary length L15, an average of a ratio L5/L15 is 0.5 or more and 5.0 or less in the texture of the nickel.
4. The steel foil according to claim 1,
wherein an amount of said nickel is 0.3 g/m² or more and 5 g/m² or less.
5. The steel foil according to claim 1,
wherein a tensile strength of the rolled steel foil is 600 MPa or more and 1,200 MPa or less at room temperature.
6. A method for manufacturing a steel foil according to claim 1, the method comprising:
Ni-plating a steel sheet with a nickel;
recrystallization-annealing the steel sheet plated with the nickel after the Ni-plating so that a recrystallization is generated by an annealing; and
cold-rolling the steel sheet plated with the nickel under a cumulative rolling reduction of 70% or more and 98% or less after the recrystallization-annealing so that a steel foil having a thickness of 100 μm or less is obtained.
7. The method for manufacturing a steel foil according to claim 6,
wherein the deposition amount of the nickel of 1 g/m² or more and 40 g/m² or less is plated to the steel sheet in the Ni-plating.
8. The method for manufacturing a steel foil according to claim 6, further comprising:
re-annealing the steel foil at a temperature of 600° C. or less after the cold-rolling.

* * * * *